United States Patent
Schilling et al.

(10) Patent No.: US 6,767,183 B2
(45) Date of Patent: Jul. 27, 2004

(54) METHODS AND APPARATUS FOR SEALING GAS TURBINE ENGINE VARIABLE VANE ASSEMBLIES

(75) Inventors: Jan Christopher Schilling, Middletown, OH (US); Thomas George Wakeman, Reading, OH (US); Steward Joseph Cline, Guilford, IN (US)

(73) Assignee: General Electric Company, Schenectady, NY (US)

( * ) Notice: Subject to any disclaimer, the term of this patent is extended or adjusted under 35 U.S.C. 154(b) by 52 days.

(21) Appl. No.: 10/246,028

(22) Filed: Sep. 18, 2002

(65) Prior Publication Data

US 2004/0052636 A1 Mar. 18, 2004

(51) Int. Cl.⁷ .............................................. F01D 17/16
(52) U.S. Cl. ........................................ 415/160; 415/230
(58) Field of Search ................................ 415/160, 230, 415/159, 162

(56) References Cited

U.S. PATENT DOCUMENTS 6,139,261 A * 10/2000 Bishop et al. ............... 415/148

* cited by examiner

*Primary Examiner*—Edward K. Look
*Assistant Examiner*—Kimya N McCoy
(74) *Attorney, Agent, or Firm*—Nathan D. Herkamp; Armstrong Teasdale LLP; Robert B. Reeser, III (57) ABSTRACT

A method enables a variable vane assembly for a gas turbine engine to be coupled to an engine casing. The variable vane assembly includes a bushing assembly and at least one variable vane that includes a platform and a vane stem. The method comprises coupling a first bushing to the engine casing in a press fit, coupling a second bushing to the variable vane, and coupling the variable vane to the engine casing such that at least a portion of the first bushing is between the engine casing and the second bushing, and such that at least a portion of the second bushing is between the first bushing and the vane stem.

17 Claims, 6 Drawing Sheets

METHODS AND APPARATUS FOR SEALING GAS TURBINE ENGINE VARIABLE VANE ASSEMBLIES

BACKGROUND OF THE INVENTION

This invention relates generally to gas turbine engines, and more specifically to variable stator vane assemblies used with gas turbine engines.

At least some known gas turbine engines include a core engine having, in serial flow arrangement, a fan assembly and a high pressure compressor which compress airflow entering the engine, a combustor which burns a mixture of fuel and air, and low and high pressure turbines which each include a plurality of rotor blades that extract rotational energy from airflow exiting the combustor. At least some known high pressure compressors include a plurality of rows of circumferentially spaced rotor blades, wherein adjacent rows of rotor blades are separated by rows of variable stator vane (VSV) assemblies. More specifically, a plurality of variable stator vane assemblies are secured to the compressor casing wherein each VSV assembly includes an airfoil that extends between adjacent rotor blades. The orientation of the VSV airfoils relative to the compressor rotor blades is variable to control air flow through the compressor.

At least one known variable stator vane assembly includes a trunnion bushing that is partially positioned within a jacket. A portion of the airfoil extends through the trunnion bushing, and the VSV assembly is bolted to the compressor stator casing. In at least some known VSV assemblies, either polymeric or carbon bushings are used to provide a low coefficient of friction to facilitate minimizing friction and wear to the VSV assembly.

During operation exposure to the gas stream may cause erosion of the VSV bushings. Furthermore, gas stream leakage paths may develop within the vane assemblies as the bushing components erode. One such leakage path may develop between an outside diameter of the VSV airfoil and the inside diameter of the bushing. Continued operation with the gas stream leakage through the VSV bushings may adversely affect engine performance.

To facilitate preventing erosion of the polymeric bushings, at least some other known VSV assemblies use metallic bushings, wherein the mating components are fabricated from the same metallic material. However, metallic bushings have a higher coefficient of friction than the polymeric bushings, and the higher friction within the VSV assembly may also cause degradation of the VSV components. Alternatively, once the bushings have worn, worn bushings are replaced. However, the configuration of the VSV assembly may make replacing the bushings a time-consuming process that may include disassembling an extensive amount of the engine.

BRIEF SUMMARY OF THE INVENTION

In one aspect a method for coupling a variable vane assembly for a gas turbine engine including a casing is provided. The variable vane assembly includes a bushing assembly and at least one variable vane that includes a platform and a vane stem. The method comprises coupling a first bushing to the engine casing in a press fit, coupling a second bushing to the variable vane, and coupling the variable vane to the engine casing such that at least a portion of the first bushing is between the engine casing and the second bushing, and such that at least a portion of the second bushing is between the first bushing and the vane stem.

In another aspect of the invention, a variable vane assembly for a gas turbine engine including a casing is provided. The variable vane assembly comprises a variable vane and a bushing assembly. The variable vane includes a platform and a vane stem extending outwardly from the platform. The bushing assembly includes an outer bushing and an inner bushing. The outer bushing is radially outward from the inner bushing such that at least a portion of the outer bushing is between the gas turbine engine casing and the inner bushing, and such that at least a portion of the inner bushing is between the outer bushing and the vane stem.

In a further aspect, a compressor for a gas turbine engine is provided. The compressor includes a rotor, a casing, and at least one row of variable vanes rotatably coupled to the casing through a plurality of bushing assemblies. The rotor includes a rotor shaft and a plurality of rows of rotor blades. The casing extends circumferentially around the plurality of rows of rotor blades, and the casing includes a plurality of openings extending therethrough. Each row of variable vanes extends between adjacent rows of the rotor blades. Each variable vane includes a platform and a vane stem extending outwardly from the platform. Each bushing assembly comprises an inner bushing and an outer bushing. Each outer bushing is radially outward from an inner bushing such that a portion of the outer bushing is between the casing and the inner bushing, and such that at least a portion of the inner bushing is between the outer bushing and each respective vane stem.

DETAILED DESCRIPTION OF THE INVENTION

Figure 1:
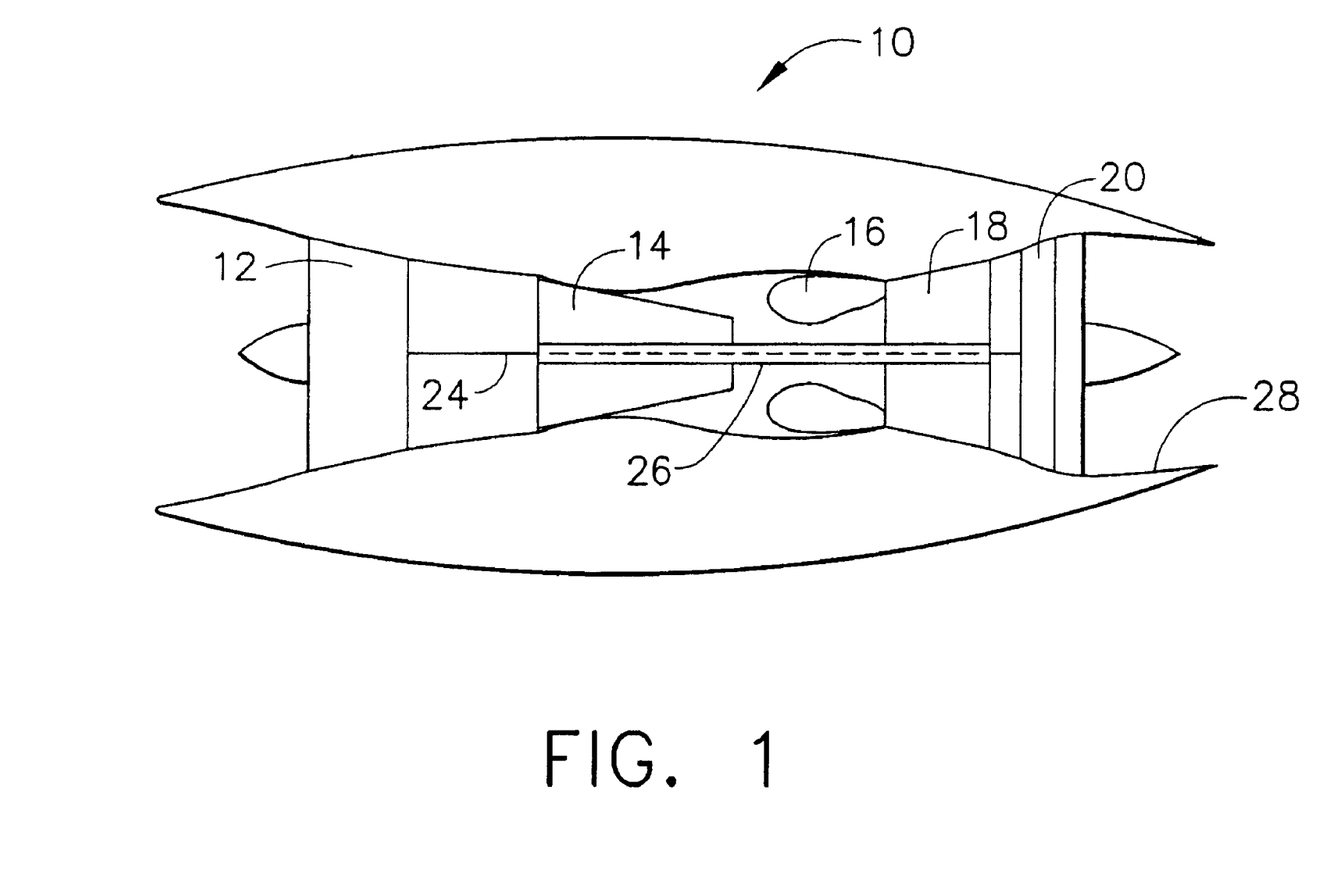
FIG. 1 is schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 24, and compressor 14 and turbine 18 are coupled by a second shaft 26. In one embodiment, the gas turbine engine is a GE90 available from General Electric Company, Cincinnati, Ohio.

In operation, air flows through low pressure compressor 12 and compressed air is supplied from low pressure compressor 12 to high pressure compressor 14. The highly compressed air is delivered to combustor 16. Airflow from combustor 16 drives turbines 18 and 20 before exiting gas turbine engine 10.

Figure 2:
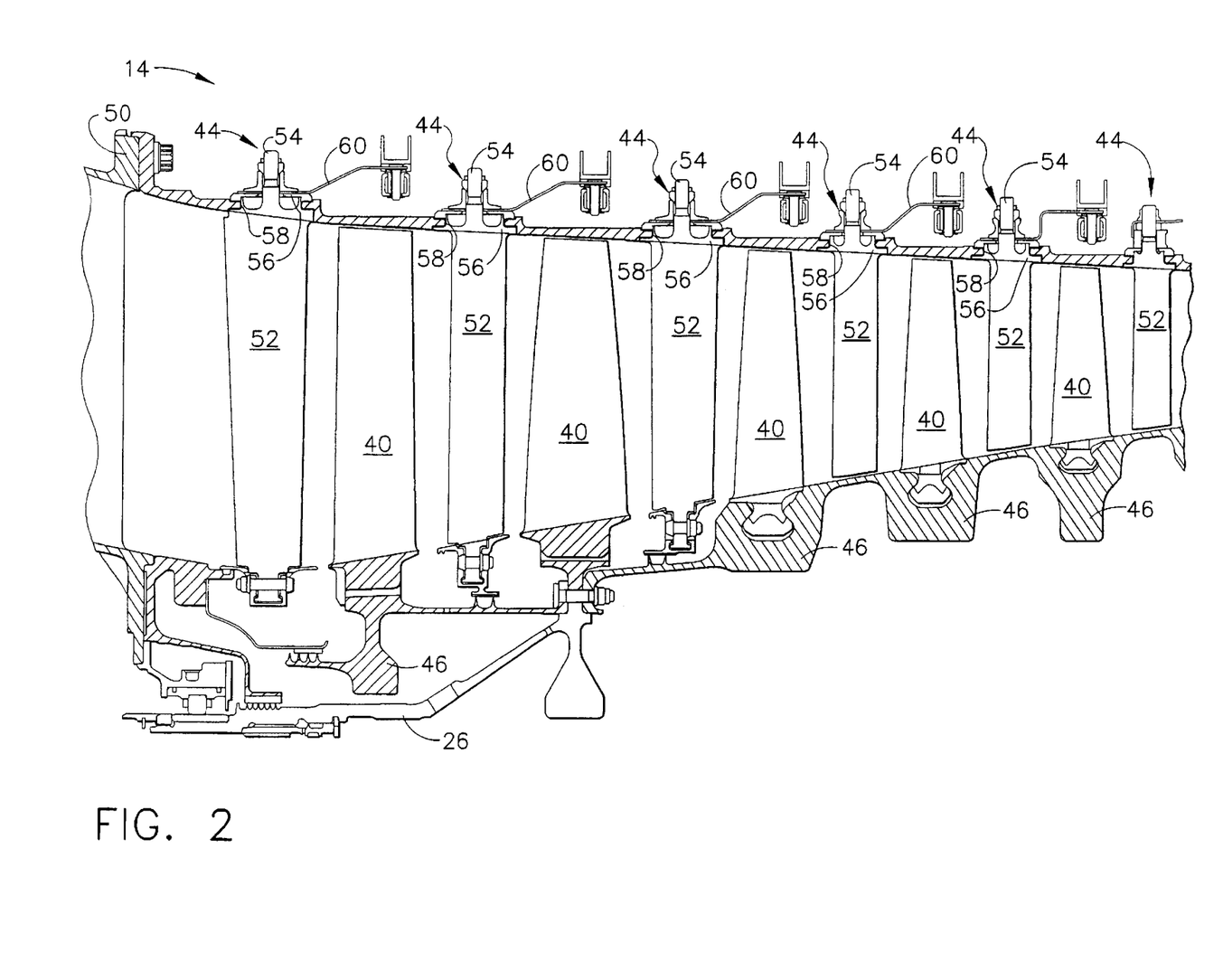
FIG. 2 is partial schematic view of gas turbine engine compressor.

FIG. 2 is partial enlarged schematic view of gas turbine engine compressor 14. Compressor 14 includes a plurality of stages, and each stage includes a row of rotor blades 40 and a row of variable vane assemblies 44. In the exemplary embodiment, rotor blades 40 are supported by rotor disks 46 and are coupled to rotor shaft 26. Rotor shaft 26 is surrounded by a casing 50 that extends circumferentially around compressor 14 and supports variable vane assemblies 44.

Variable vane assemblies 44 each include a variable vane 52 and a vane stem 54 that extends substantially perpendicularly from a vane platform 56. More specifically, vane platform 56 extends between variable vane 52 and vane stem 54. Each vane stem 54 extends through a respective opening 58 defined in casing 50. Casing 50 includes a plurality of openings 58. Variable vane assemblies 44 also include a lever arm 60 that extends from each variable vane 52 and is utilized to selectively rotate variable vanes 52 for changing an orientation of vanes 52 relative to the flow path through compressor 14 to facilitate increased control of air flow through compressor 14.

Figure 3:
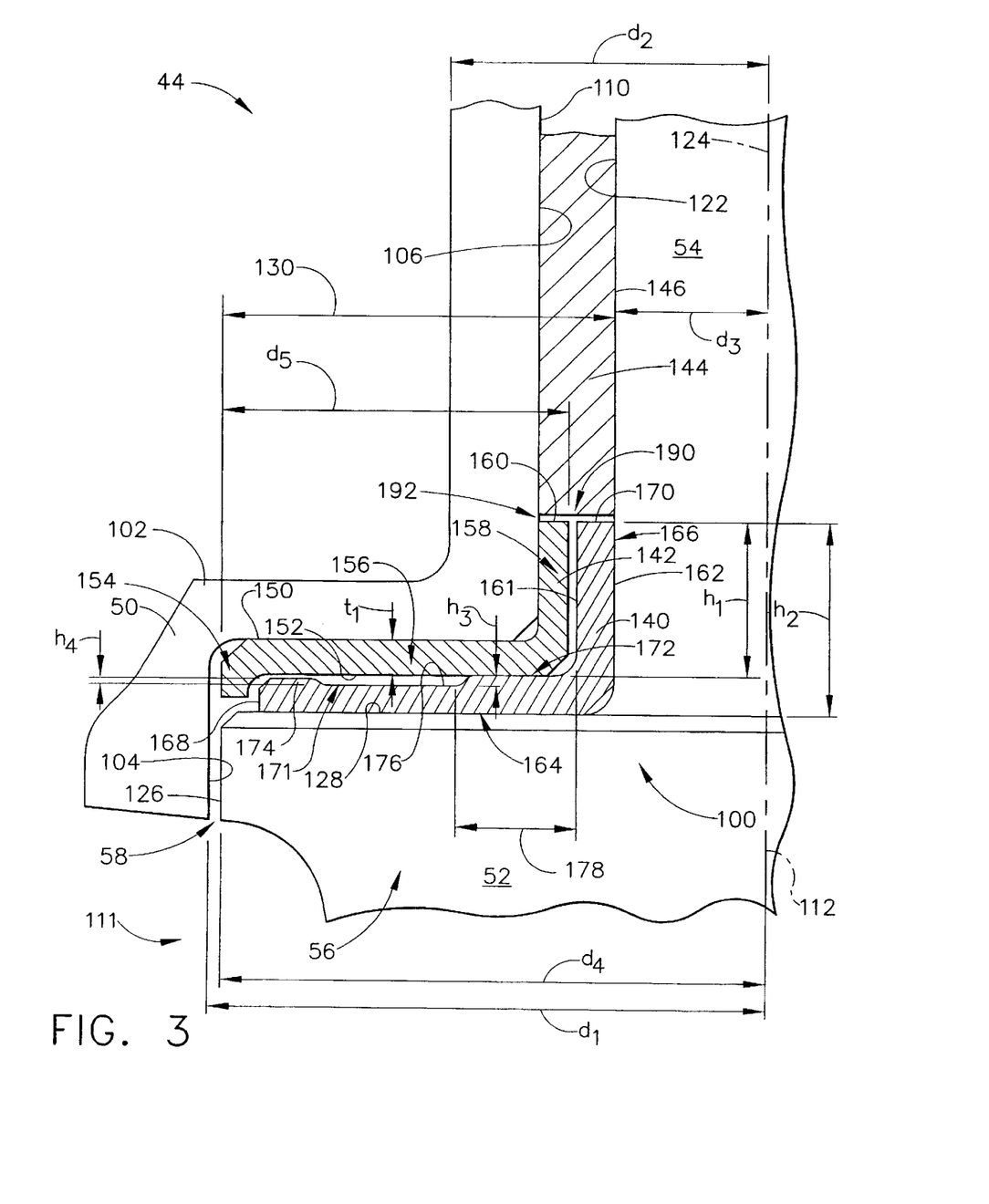
FIG. 3 is a partial exploded view of a variable vane assembly shown in FIG. 2 including a bushing assembly.

FIG. 3 is a partial exploded view of variable vane assembly 44 including variable vane 52 and a bushing assembly 100 used in rotatably coupling variable vane 52 to engine casing 50 within casing opening 58. Casing 50 includes a plurality of casing towers 102 which support each variable vane 52 and are spaced circumferentially around engine 10 (shown in FIG. 1). Each casing tower 102 includes a recessed portion 104 and a substantially cylindrical portion 106 that extends from recessed portion 104. In an alternative embodiment, casing tower 102 includes additional recessed portions (not shown in FIG. 2). Casing tower portions 104 and 106 are defined by an inner wall 110 that also defines opening 58 such that opening 58 extends between a radially inner side 111 of variable vane assembly 44 to a radially outer side (not shown in FIG. 2) of variable vane assembly 44.

Casing tower recessed portion 104 has a diameter $d_1$, measured with respect to a centerline 112 extending through casing opening 58, that is larger than a diameter $d_2$ of casing tower cylindrical portion 106 measured with respect to centerline 112. In the exemplary embodiment, cylindrical portion 106 extends substantially perpendicularly outwardly from recessed portion 104.

Variable vane stem 54 has an outer diameter $d_3$ that is measured with respect to an outer surface 122 of variable vane assembly 44, and with respect to a centerline axis of symmetry 124 extending through vane assembly 44. Variable vane stem diameter $d_3$ is smaller than casing tower cylindrical portion diameter $d_2$. Variable vane platform 56 has an outer diameter $d_4$ that is larger than variable vane stem diameter $d_3$, and is smaller than casing tower recessed portion diameter $d_1$. More specifically, an outer edge 126 of radially outer surface 128 of vane platform 56 extends a distance 130 outwardly from vane stem 54. As such, casing tower cylindrical portion 106 is sized to receive variable vane stem 54 therein, and casing tower recessed portion 104 is sized to receive variable vane platform 56 therein.

Bushing assembly 100 includes a radially inner bushing 140, a radially outer bushing 142, and a sleeve bushing 144. Sleeve bushing 144 extends circumferentially around variable vane stem 54 such that an inner surface 146 of sleeve bushing 144 is in sealing contact against vane stem outer surface 122 and casing tower cylindrical portion 106. Sleeve bushing 144 is fabricated from a material that has a lower co-efficient of friction than a co-efficient of friction associated with the material used in fabricating bushings 140 and 142. In one embodiment, sleeve bushing 144 is fabricated from a polymeric material. In another embodiment, sleeve bushing 144 is fabricated from a non-polymeric material.

Radially outer bushing 142 includes an outer surface 150 and an inner surface 152. Bushing 142 also includes a retainer 154, a substantially planar portion 156, and a substantially cylindrical portion 158. Planar portion 156 extends between retainer 154 and cylindrical portion 158, and in the exemplary embodiment, extends substantially perpendicularly from planar portion 156. A radial height $h_1$ of bushing 142 is measured from planar portion 156 to an end surface 160 of cylindrical portion 158. Bushing radial height $h_1$ is variably selected based on hertz contact stress that may be induced within variable vane assembly 44. Retainer 154 facilitates secondary alignment of vane 52 as an outer surface 161 of radially inner bushing 140 and outer bushing inner surface 152 along cylindrical portion 158 wear.

Bushing 142 also has an outer diameter $d_5$. Bushing outer diameter $d_5$ is selected such that when variable vane assembly 44 is fully assembled, bushing retainer outer surface 150 remains within a signature footprint of variable vane platform outer surface 128. In the exemplary embodiment, bushing 142 has a thickness $t_1$ that is substantially constant therethrough.

Radially inner bushing 140 includes a radially outer surface 161 and a radially inner surface 162. Bushing 140 also includes a platform portion 164 and a substantially cylindrical portion 166. Platform portion 164 extends from an outer edge 168 of bushing 140 to cylindrical portion 166, and cylindrical portion 166 extends substantially perpendicularly from platform portion 164. A radial height $h_2$ of bushing 140 is measured from platform portion 164 to an end surface 170 of cylindrical portion 166. Bushing radial height $h_2$ is variably selected based on hertz contact stress that may be induced within variable vane assembly 44.

Radially inner bushing platform portion 164 includes a recessed portion 171 such that a pair of annular shoulders 172 and 174 are defined by recessed portion 171. More specifically, shoulder 172 is between shoulder 174 and bushing cylindrical portion 166, and has a radial height $h_3$ measured with respect to a lower surface 176 of recessed portion 171 and is taller than a radial height $h_4$ of shoulder 174 measured with respect to surface 176. A width 178 of shoulder 172 is selected to provide an amount of radial contact between bushings 140 and 142 under uniform loading. More specifically, the amount of radial contact is a function of internal pressure loading and an amount of force induced to bushing assembly 44.

Bushings 140 and 142 are fabricated from a material that is resistant to wear. In the exemplary embodiment, bushings 140 and 142 are fabricated from a wear-resistant material, such as, but not limited to triballoy.

During assembly of variable vane assembly 44, sleeve bushing 144 is coupled circumferentially around vane stem 54 and casing 50 (bushing 144 is predominately retained by casing 50 and has a tighter fit on surface 110 than surface 122), radially outer bushing 142 is coupled to engine casing 50, and radially inner bushing 140 is coupled to variable vane 52. Specifically, radially outer bushing 142 is coupled to engine casing 50 such that an outer surface 150 of bushing planar portion 156 is positioned against casing inner wall 110 within casing recessed portion 104 and bushing cylindrical portion 158 is positioned against casing inner wall 110 within casing cylindrical portion 106. Additionally, radially inner bushing 140 is coupled against variable vane 52 such that inner bushing cylindrical portion 166 is positioned against vane stem 54 and inner bushing platform portion 164 is positioned against vane platform 56. In the exemplary embodiment, inner bushing 140 is press fit to vane 52, and outer bushing 142 is press fit to casing 50.

Variable vane 52, including inner bushing 140 and sleeve bushing 144 is then inserted through a respective casing opening 58 and lever arm 60 (not shown in FIG. 3) before being coupled to casing 50 by a fastener (not shown). More specifically, when fully coupled to casing 50, inner bushing shoulder 172 contacts outer bushing 142 such that a predetermined gap 190 is defined between outer bushing cylindrical portion 158 and inner bushing cylindrical portion 166. Gap 190 facilitates accounting for initial bushing wear between bushings 140 and 142, as well as thermal expansion between mating bushings 140 and 142. Furthermore, when variable vane 52 is fully coupled to casing 50, sleeve bearing 144 contacts casing inner wall 110 in sealing contact to facilitate preventing air leakage through variable vane assembly 44.

Under uniform loading, radial contact shoulder 174 also facilitates a radial stack up assembly gap 192 being defined between bushings 140 and 142, and sleeve bushing 144. More specifically, because shoulder 172 does not extend along the entire bushing platform portion 164, shoulder 172 facilitates point loading of shoulder 174 and inner bushing edge 168, and as such an amount of friction loading induced within variable vane assembly 44 is reduced in comparison to other bushings in which bushing portion 164 is substantially planar. Accordingly, reduced frictional loading enables sleeve bushing 144 to be manufactured from a different material than that of bushings 140 and 142, and as such, an inner load induced to variable vane assembly 44 is distributed through bushing assembly 100. Furthermore, because sleeve bushing 144 may be fabricated from a material having a low co-efficient of friction, overall friction induced within variable vane assembly 44 may be maintained at a reduced level in comparison to other assemblies including only metallic components.

During operation, shoulder 174 will contact outer bushing 142 during pressure loading to facilitate reducing air leakage through variable vane assembly 44. However, a relative small size of shoulder 174 facilitates minimizing torque induced between bushings 140 and 142 during operation. Furthermore, because shoulder 174 may contact bushing 142 as radially inner bushing outer surface 161 and outer bushing inner surface 152 wear, vane tilt is facilitated to be reduced. In addition, during operation, shoulder 174 facilitates bushing 142 wearing more than inner bushing 140. Accordingly, because bushing assembly 100 is a multi-piece assembly, bushing replacement may occur without a complete engine teardown, and as such, bushing assembly 100 facilitates reducing maintenance costs.

Figure 4:
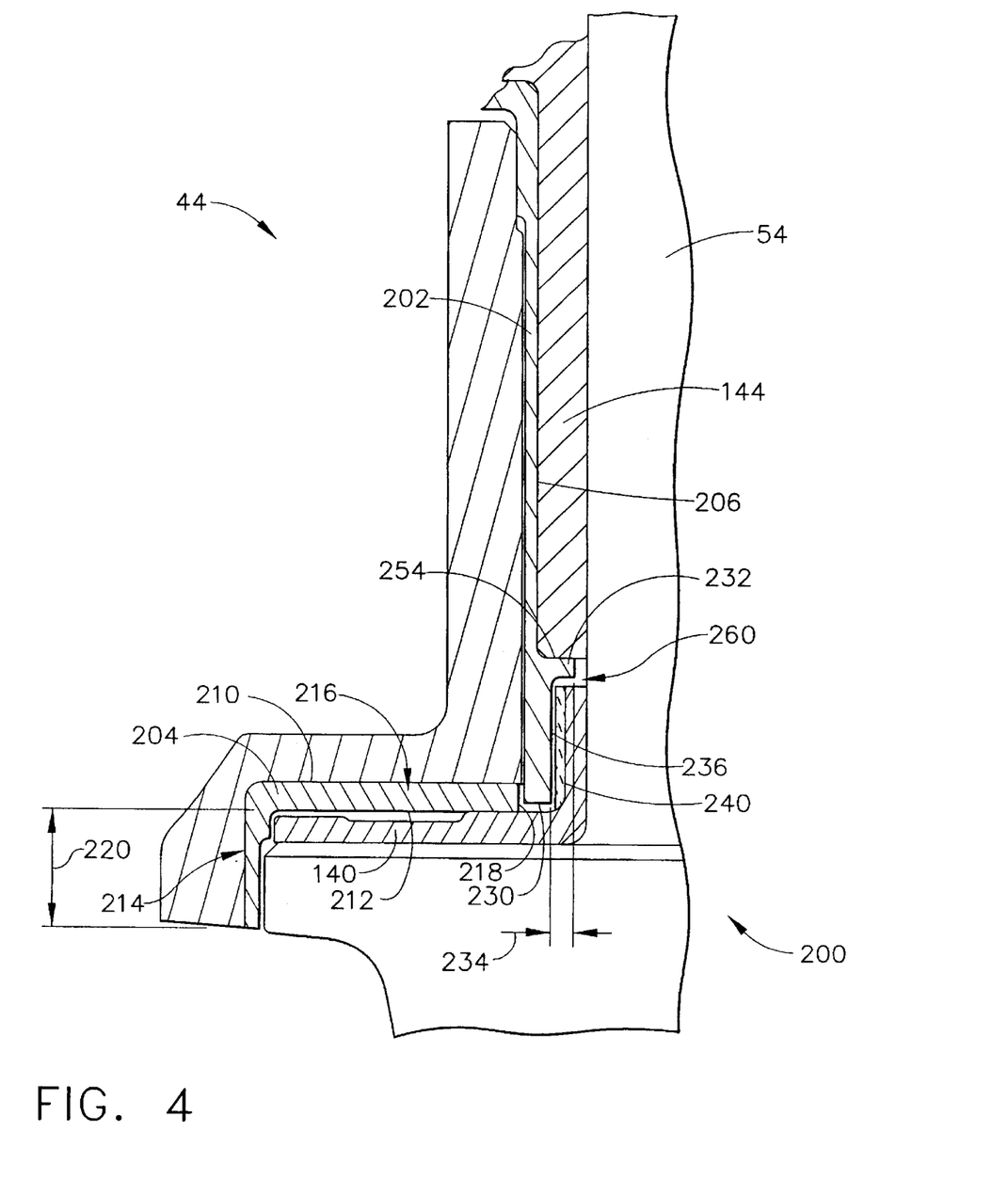
FIG. 4 is a partial exploded view of the variable vane assembly shown in FIG. 2 including an alternative embodiment of a bushing assembly.

FIG. 4 is a partial exploded view of variable vane assembly 44 including an alternative embodiment of a bushing assembly 200. Bushing assembly 200 is substantially similar to bushing assembly 100 shown in FIG. 3, and components in bushing assembly 200 that are identical to components of bushing assembly 100 are identified in FIG. 4 using the same reference numerals used in FIG. 3. Accordingly, bushing assembly 200 includes radially inner bushing 140 and sleeve bushing 144. Bushing assembly 200 also includes a bushing carrier 202 and a radially outer bushing 204.

Radially outer bushing 204 includes an outer surface 210 and an inner surface 212. Bushing 204 also includes a retainer 214 that extends substantially perpendicularly from a substantially planar portion 216. More specifically, planar portion 216 extends between retainer 214 and an inner edge 218, and retainer 214 extends for a distance 220 from planar portion 216. When vane assembly 44 is fully assembled, retainer distance 220 enables outer bushing 204 to extend from casing recessed portion 104 between vane platform 56 and engine casing 50.

Bushing carrier 202 extends from a first end (not shown) that is adjacent a first end (not shown) of sleeve bushing 144 to a second end 230 that is adjacent vane platform 56, bushing 140, and bushing inner edge 218. A shoulder 232 extends substantially perpendicularly a distance 234 from an inner surface 236 of bushing carrier 202. Specifically, when fully assembled, shoulder 232 extends between sleeve bushing 144 and radially inner bushing 140 towards vane stem 54. In one embodiment, vane stem 54 also includes a relief cut (not shown) that enables shoulder 232 to extend from bushing carrier inner surface 236 a longer distance 234.

Radially inner bushing 140 is coated with a wear resistant material 240. Specifically, a portion of bushing outer surface 161 extending over inner bushing cylindrical portion 166 is coated with wear resistant material 240. In one embodiment, material 240 is a ceramic coating.

During assembly of variable vane assembly 44, radially outer bushing 204 is coupled to engine casing 50, and radially inner bushing 140 is coupled to variable vane 52. Specifically, radially outer bushing 204 is coupled to engine casing 50 such that an outer surface 210 of bushing planar portion 216 is positioned against casing inner wall 110 within casing recessed portion 104, and such that bushing inner edge 218 is within a signature footprint of casing recessed portion 104. Radially inner bushing 140 is coupled against variable vane 52 as described above. In the exemplary embodiment, inner bushing 140 is press fit to vane 52, and outer bushing 204 is press fit to casing 50.

Bushing carrier 202 is then coupled to engine casing 50 such that bushing carrier 202 is pressed against casing inner wall 110 within casing cylindrical portion 106. Bushing carrier 202 facilitates retaining inner bushing 140, outer bushing 204, and sleeve bushing 144 in alignment. Variable vane 52, including inner bushing 140 is then inserted through a respective casing opening 58. More specifically, when fully coupled to casing 50, inner bushing shoulder 172 contacts outer bushing 204 adjacent outer bushing edge 218. Sleeve bushing 144 is coupled circumferentially around vane stem 54 such that sleeve bearing 144 contacts a bushing carrier inner surface 206 in sealing contact to facilitate preventing air leakage through variable vane assembly 44, and such that a radially inner end 254 of sleeve bushing 144 is positioned against bushing carrier shoulder 232.

When vane assembly 44 is fully coupled to casing 50, under uniform loading, radial contact shoulder 172 also facilitates a radial stack up assembly gap 260 being defined between bushing carrier shoulder 232 and radially inner bushing 140.

During operation, shoulder 174 will contact outer bushing 204 only in the extreme condition of contact between shoulder 172 against surface 212 to facilitate reducing air leakage through variable vane assembly 44. However, a relative small size of shoulder 172 facilitates minimizing torque induced between bushings 140 and 204 during operation. Furthermore, because shoulder 174 may contact bushing 142, vane tilt is facilitated to be reduced. Bushing carrier 202 facilitates external bushing replacement without a complete engine teardown, and as such, bushing assembly 200 facilitates reducing maintenance costs.

Figure 5:
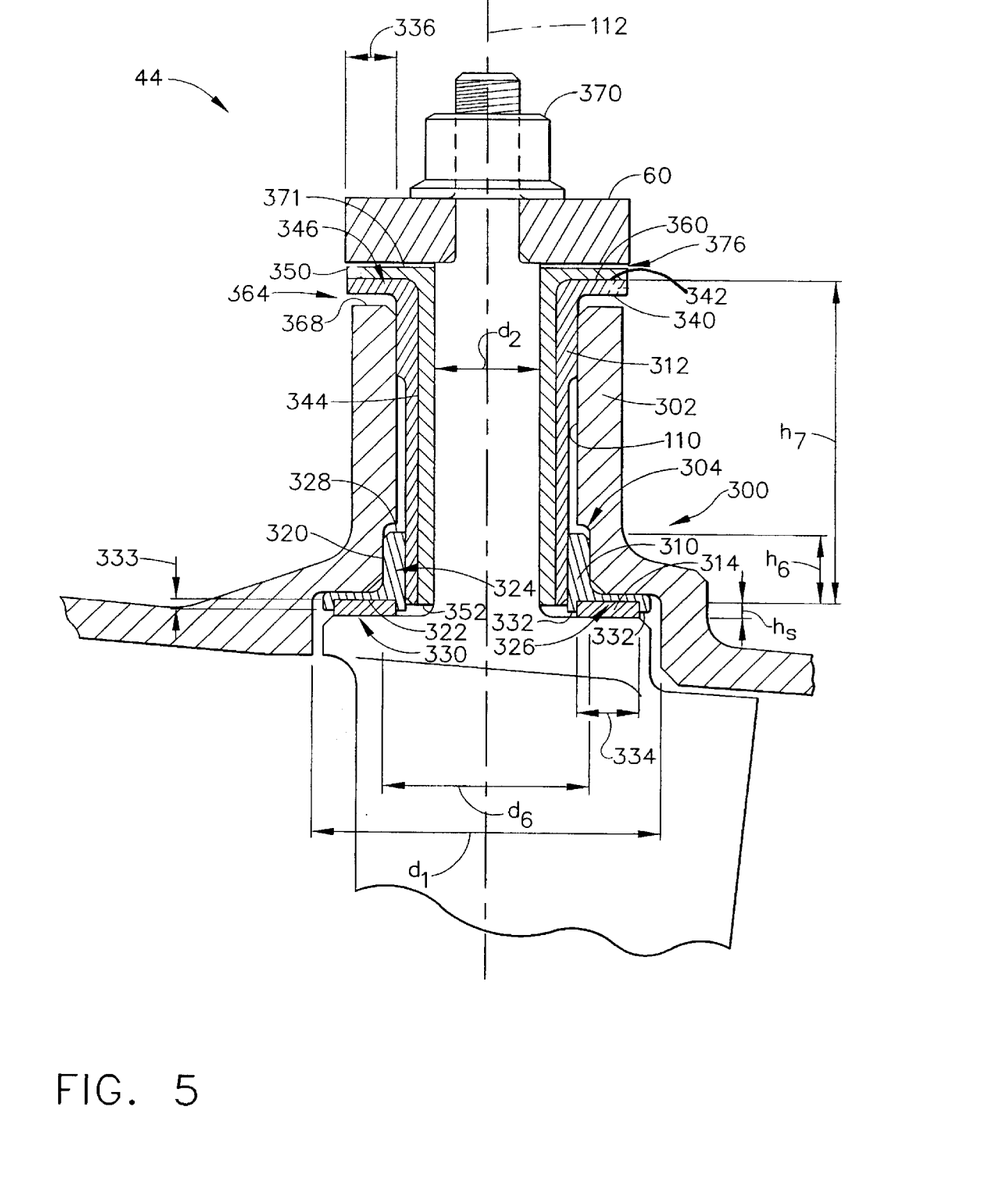
FIG. 5 is a partial exploded view of the variable vane assembly shown in FIG. 2 including another alternative embodiment of a bushing assembly.

FIG. 5 is a partial exploded view of variable vane assembly 44 including an alternative embodiment of a bushing assembly 300. More specifically, bushing assembly 300 is for use with an alternative casing tower 302. Casing tower 302 is substantially similar to casing tower 102 (shown in FIG. 3), and components in casing tower 302 that are identical to components of casing tower 102 are identified in FIG. 5 using the same reference numerals used in FIG. 3. Accordingly, casing tower 302 includes an additional recessed portion 304 that extends radially outwardly from casing tower cylindrical portion inner wall 110 towards casing tower 302, and is positioned axially to extend from and into recessed portion 104. Casing tower recessed portion 304 has a diameter $d_6$, measured with respect to casing opening centerline 112, that is larger than casing tower cylindrical portion diameter $d_2$, and is smaller than casing tower recessed portion diameter $d_1$.

Bushing assembly 300 is substantially similar to bushing assembly 100 shown in FIG. 3, and components in bushing assembly 300 that are identical to components of bushing assembly 100 are identified in FIG. 5 using the same reference numerals used in FIG. 3. Accordingly, bushing assembly 300 includes a radially inner bushing 310, a radially outer bushing 312, and an annular platform seal 314.

Radially inner bushing 310 includes an outer surface 320 and an inner surface 322. Bushing 310 also includes a substantially cylindrical portion 324 and a platform portion 326 that extends radially outwardly from cylindrical portion 324. In the exemplary embodiment, cylindrical portion 324 is substantially perpendicular to platform portion 326. A radial height $h_6$ of bushing 310 is measured from platform portion 326 to an end surface 328 of cylindrical portion 324.

Bushing platform portion 326 includes a recessed area 330 that extends from bushing inner surface 322 towards bushing outer surface 320. Recessed area 330 defines a pair of projections 332 that extend outwardly towards variable vane platform 56 from bushing platform portion 326. Recessed area 330 has a width 334 measured between projections 332, and a depth 333 measured with respect to projections 332. Platform seal 314 has a height $h_s$ that is taller than recessed area depth 333, and a width 336 that is slightly less than recessed area width 334. Accordingly, when variable vane assembly 44 is fully assembled, a portion of platform seal 314 is received within recessed area 330 in sealing contact between projections 332.

Radially outer bushing 312 includes an inner surface 340 and an outer surface 342. Bushing 312 also includes a substantially cylindrical portion 344 and a retainer portion 346 that extends radially outwardly from cylindrical portion 344. More specifically, in the exemplary embodiment, retainer portion 346 extends substantially perpendicularly from bushing cylindrical portion 344 to an outer end surface 350 of bushing 312, and cylindrical portion 344 extends from an inner end surface 352 of bushing 312 axially to bushing retainer portion 346. A radial height $h_7$ of bushing 312 is measured from retainer portion 346 to bushing inner end surface 352. Bushing radial height $h_7$ is variably selected based on hertz contact stresses that may be induced within variable vane assembly 44. Bushing 312 and 310 are each fabricated from a material that is compatible with casing 50.

During assembly of variable vane assembly 44, outer bushing outer surface 340 is coated with a wear resistant material 360 that has a relatively low coefficient of friction in comparison to materials used in fabricating bushings 310 and 312. Radially inner bushing 310 is coupled to engine casing 50, and radially outer bushing 310 is coupled to casing 50. Specifically, radially inner bushing 310 is coupled to engine casing 50 such that radially inner bushing outer surface 320 is positioned against casing inner wall 110 within casing recessed portion 104, and bushing cylindrical portion 324 is positioned against casing inner wall 110 within casing recessed portion 304.

Radially outer bushing 312 is coupled to engine casing 50 such that outer bushing cylindrical portion 344 is at least partially against casing inner wall 110 within casing cylindrical portion 106, and such that a portion of outer bushing 312 overlaps radially inner bushing 314 in a slide fit. In the exemplary embodiment, inner bushing 314 and outer bushing 312 are both press fit to casing 50. Additionally, radially outer bushing 312 is coupled to engine casing 50 such that a predetermined gap 364, known as a stack-up gap, is defined between radially outer bushing retainer portion 346 and a radially outer edge 368 of engine casing tower 302. Gap 364 facilitates stackup of inner bushing 310, casing tower 302, and bushing 312 such that a gap 376 defined between lever arm 60 and outer bushing retainer portion 346 is facilitated to be minimized. Minimizing gap 376 facilitates minimizing air leakage through variable vane assembly 44. Gap 364 also facilitates bushings 312 being replaced without a complete engine teardown, and as such, bushing assembly 300 facilitates reducing maintenance costs.

Platform seal 314 is then positioned on variable vane 52. Variable vane 52 is then inserted through a respective casing opening 58, and lever arm 60 before being coupled to casing 50 by a fastener 370, such that platform seal 314 is received in sealing contact within inner bushing recessed area 330. More specifically, when fully coupled to casing 50, outer bushing wear resistant material 360 contacts vane stem 54 in sealing contact along outer bushing cylindrical and retainer portion 344 and along surface 371, to facilitate preventing air leakage within variable vane assembly 44.

Additionally, when variable vane 52 is coupled to casing 50, a pre-determined assembly/disassembly gap 376 is defined between lever arm 60 and outer bushing retainer portion 346.

Figure 6:
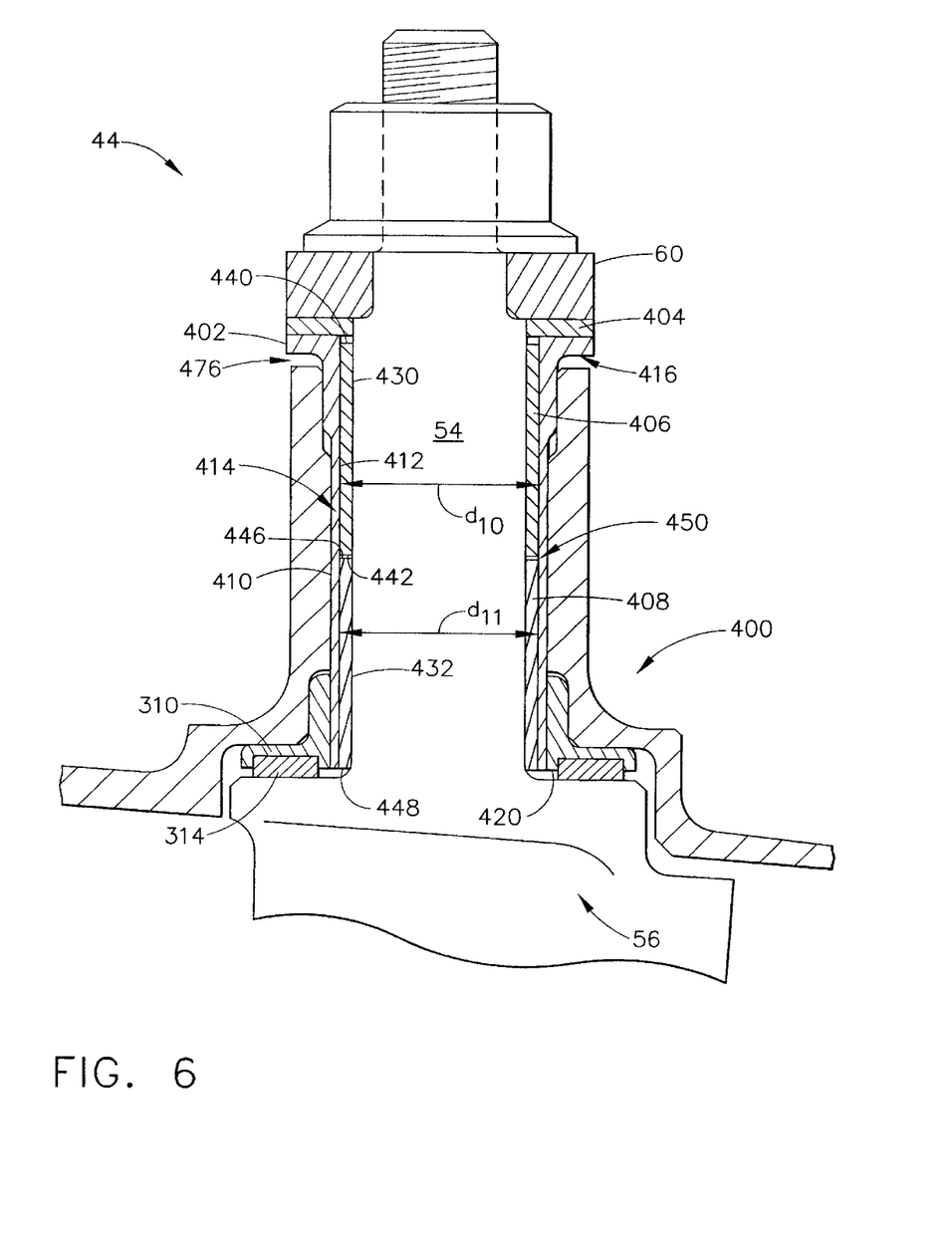
FIG. 6 is a partial exploded view of the variable vane assembly shown in FIG. 2 including a further alternative embodiment of a bushing assembly.

FIG. 6 is a partial exploded view of variable vane assembly 44 including a further alternative embodiment of a bushing assembly 400. More specifically, bushing assembly 400 is for use with casing tower 302. Bushing assembly 400 is substantially similar to bushing assembly 300 shown in FIG. 5, and components in bushing assembly 400 that are identical to components of bushing assembly 300 are identified in FIG. 6 using the same reference numerals used in FIG. 5. Accordingly, bushing assembly 400 includes radially inner bushing 310 and annular platform seal 314. Bushing assembly 400 also includes a bushing carrier 402, an annular outer radial washer 404, an outer journal bushing 406, and an inner journal 408. Outer radial washer 404 is substantially similar to platform seal 314 and extends around vane stem 54 between both outer journal bearing 406 and bushing carrier 402, and lever arm 60.

Bushing carrier 402 includes an outer surface 410 and an inner surface 412. Bushing carrier 402 also includes a substantially cylindrical portion 414 and a retainer portion 416 that extends radially outwardly from cylindrical portion 414. More specifically, in the exemplary embodiment, retainer portion 416 extends substantially perpendicularly from bushing cylindrical portion 414 adjacent lever arm 60. Bushing carrier cylindrical portion 414 extends from retainer portion 416 to an inner retention device 420 that extends radially inwardly from cylindrical portion 414 adjacent vane platform 56.

Outer journal bushing 406 and inner journal bushing 408 each extend circumferentially around variable vane stem 54 such that an inner surface 430 and 432 of each respective bushing 406 and 408 is in sealing contact against vane stem outer surface 122. More specifically, outer journal bushing 406 is substantially cylindrical and has an outer diameter $d_{10}$ that is substantially constant between a radially outer end 440 and a radially inner end 442. Inner journal bushing 408 is also substantially cylindrical and has an outer diameter $d_{11}$ that is substantially constant between a radially outer end 446 and a radially inner end 448. A seal 450 extends around vane stem 54 between outer and inner journal bushings 406 and 408, respectively.

During assembly of variable vane assembly 44, radially inner bushing 310 is coupled to engine casing 50 as described above, and bushing carrier 402 is coupled to engine casing 50 and radially inner bushing 310. Specifically, bushing carrier 402 is press fit to engine casing within a portion of bushing carrier cylindrical portion 414 that is adjacent bushing carrier retainer portion 416. When press fit as described above, a portion of bushing carrier 402 adjacent radially inner bushing 310 is in a slide fit with radially inner bushing 310. Outer journal bushing 406 and inner journal bushing 408 are each coupled to vane stem 54 such that seal 450 is between bushings 406 and 508.

Variable vane 52 is then inserted through a respective casing opening 58 and lever arm 60 before being coupled to casing 50 by a fastener 370. When fully coupled to casing 50, journal bushings 406 and 408 are in sealable contact with bushing carrier 420 to facilitate preventing air leakage through VSV assembly 44. Furthermore, when fully coupled to casing 50, bushing carrier retention device 420 is coupled against outer journal bushing end 410, and a predefined gap 476 is defined between bushing carrier 420 and engine casing 50. Gap 476 facilitates bushings replacement without a complete engine teardown, and as such, bushing assembly 400 facilitates reducing maintenance costs.

The above-described variable vane assemblies are cost-effective and highly reliable. The VSV assembly includes a bushing assembly that facilitates reducing gas leakage through the VSV, thus reducing bushing wear within the VSV assembly. The bushing assembly includes a first bushing that is press fit to the engine casing, and a second bushing that is coupled to the VSV assembly, such that the bushing assembly may be externally replaced without a complete engine tear down. Furthermore, because the bushing assembly may be fabricated from different materials, the VSV assembly facilitates efficient low friction load transfer between the variable vane and the casing. As a result, the bushing assembly facilitates extending a useful life of the VSV assembly shaft in a cost-effective and reliable manner.

Exemplary embodiments of VSV assemblies are described above in detail. The systems are not limited to the specific embodiments described herein, but rather, components of each assembly may be utilized independently and separately from other components described herein. Each VSV assembly component can also be used in combination with other VSV assembly components.

While the invention has been described in terms of various specific embodiments, those skilled in the art will recognize that the invention can be practiced with modification within the spirit and scope of the claims.

What is claimed is:

1. A method for coupling a variable vane assembly for a gas turbine engine including a casing, the variable vane assembly including a bushing assembly and at least one variable vane that includes a platform and a vane stem, said method comprising:

coupling a first bushing to the engine casing in a press fit;

coupling a second bushing to the variable vane; and coupling the variable vane to the engine casing such that at least a portion of the first bushing is between the engine casing and the second bushing, and such that at least a portion of the second bushing is between the first bushing and the vane stem, and such that a predetermined gap is defined between the first and second bushings.

2. A method in accordance with claim 1 further comprising coupling a sleeve bushing to the vane stem such that the sleeve bushing is between the first and second bushings and the vane stem.

3. A method in accordance with claim 1 further comprising coupling a bushing carrier to the variable vane to retain at least one of the first and second bushings.

4. A method in accordance with claim 1 further comprising applying a wear resistant coating to at least one of the first bushing, the second bushing, and the vane stem.

5. A variable vane assembly for a gas turbine engine including a casing, said variable vane assembly comprising:

a variable vane comprising a platform and a vane stem extending outwardly from said platform; and a bushing assembly comprising an outer bushing and an inner bushing, said outer bushing radially outward from said inner bushing such that at least a portion of said outer bushing between the gas turbine engine casing and said inner bushing, and such that at least a portion of said inner bushing between said outer bushing and said vane stem, said inner bushing is positioned against said vane assembly vane stem and said outer bushing is positioned against said engine casing such that a pre-determined gap is defined between said bushing assembly inner and outer bushings.

6. A variable vane assembly in accordance with claim 5 wherein said bushing assembly further comprises a sleeve bushing, said outer and inner bushings between said sleeve bushing and said vane assembly platform.

7. A variable vane assembly in accordance with claim 5 wherein at least one of said inner and said outer bushings comprises at least one shoulder extending outwardly from at least one of said inner and outer bushings for engaging said other bushing assembly bushing, said shoulder facilitating reducing wear between said inner and outer bushings.

8. A variable vane assembly in accordance with claim 5 wherein at least a portion of at least one of said inner and said outer bushings coated with a wear resistant coating.

9. A variable vane assembly in accordance with claim 5 wherein said bushing assembly further comprises a bushing carrier configured to retain at least one of said inner and outer bushings.

10. A variable vane assembly in accordance with claim 5 wherein said bushing assembly coupled around said variable vane such that a pre-determined gap is defined between said casing and at least one of said inner and outer bushings.

11. A compressor for a gas turbine engine, said compressor comprising:

a rotor comprising a rotor shaft and a plurality of rows of rotor blades;

a casing extending circumferentially around said plurality of rows of rotor blades, said casing comprising a plurality of openings extending therethrough; and at least one row of variable vanes rotatably coupled to said casing through a plurality of bushing assemblies, said variable vanes extending between adjacent rows of said plurality of rows of rotor blades, each said variable vane comprising a platform and a vane stem extending outwardly from said platform, each said bushing assembly comprising an inner bushing and an outer bushing, said outer bushing radially outward from said inner bushing such that a portion of said outer bushing between said casing and said inner bushing, and such that at least a portion of said inner bushing between said outer bushing and each respective vane stem, at least one of said variable vane inner and outer bushings is press fit to said engine casing.

12. A compressor in accordance with claim 11 wherein at least one of each said variable vane inner bushing and said outer bushing comprises a shoulder extending outwardly for engaging each said other respective inner and outer bushing.

13. A compressor in accordance with claim 1 wherein said variable vane inner and outer bushings coupled within said compressor such that a predetermined gap is defined between each said inner bushing and said outer bushing.

14. A compressor in accordance with claim 11 wherein each said variable vane bushing assembly further comprises a sleeve bushing extending circumferentially around said vane stem.

15. A compressor in accordance with claim 11 wherein a portion of at least one of each said variable vane inner bushing and outer bushing is coated with a wear resistant coating.

16. A compressor in accordance with claim 11 wherein each said variable vane bushing assembly further comprises a bushing carrier positioned to retain at least one of each said variable vane inner and outer bushing.

17. A compressor in accordance with claim 11 wherein said variable vane inner and outer bushings coupled within said compressor such that a predetermined gap is defined between each said inner bushing and said outer bushing, wherein said gap facilitates sealing within said bushing assembly.

* * * * *

UNITED STATES PATENT AND TRADEMARK OFFICE
CERTIFICATE OF CORRECTION

PATENT NO. : 6,767,183 B2
DATED : July 27, 2004
INVENTOR(S) : Schilling et al.

It is certified that error appears in the above-identified patent and that said Letters Patent is hereby corrected as shown below:

Column 11,
Line 17, delete "claim 1 wherein" and insert therefor -- claim 11 wherein --.

Signed and Sealed this

Sixth Day of September, 2005

JON W. DUDAS
*Director of the United States Patent and Trademark Office*